April 19, 1932.  A. GASTONGUAY ET AL  1,854,832
SUPPORT
Original Filed Aug. 10, 1929
FIG. 1
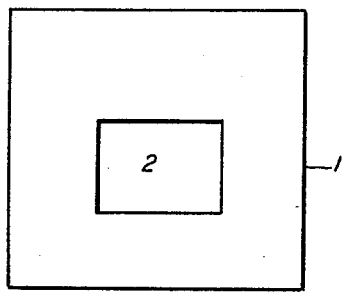
FIG. 2
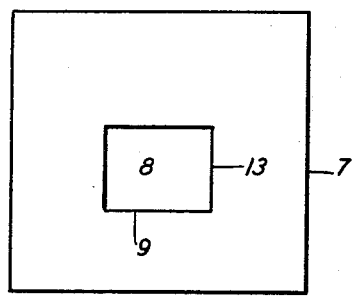
FIG. 3
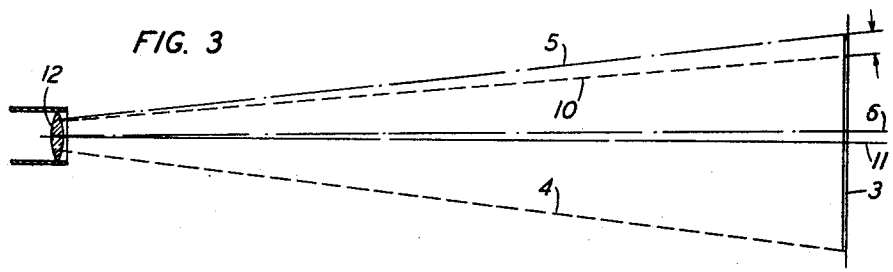
FIG. 4
FIG. 5
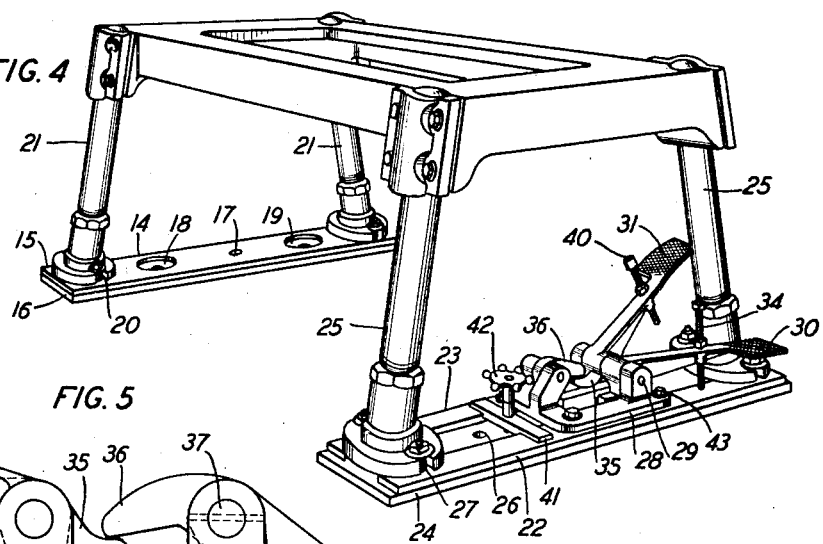
INVENTORS: A. GASTONGUAY
G. PULLER
BY
G.H.Heydt
ATTORNEY Patented Apr. 19, 1932

1,854,832

UNITED STATES PATENT OFFICE

ANTONIO GASTONGUAY, OF NEW YORK, AND GEORGE PULLER, OF PORT WASHINGTON, NEW YORK, ASSIGNORS TO BELL TELEPHONE LABORATORIES, INCORPORATED, OF NEW YORK, N. Y., A CORPORATION OF NEW YORK

SUPPORT

Original application filed August 10, 1929, Serial No. 384,923. Divided and this application filed November 14, 1930. Serial No. 495,770.

This invention relates to supports for motion picture projectors and particularly to supports for projectors for both silent motion pictures and sound pictures of the film type. This application is a division of our copending application Serial No. 384,923, filed August 10, 1929.

The object of this invention is a support for readily adapting a projector to show either silent motion pictures or sound pictures.

A feature of this invention is a conveniently adjustable mechanism to shift the projector and thus change the angle of projection by a predetermined amount.

In a sound picture film, the sound record is commonly placed on one side of the film close to the perforations, and the width of the picture is correspondingly reduced. The height of the picture on the sound film is regulated by the distance the film is moved by each operation of the intermittent action, and for practical reasons, the height of the picture in both silent and sound films is the same.

In many motion picture theaters, the reflecting area of the screen is surrounded by a dark border which outlines an area equal to the projected area of a silent picture. As a result, when sound pictures are projected with the sound record masked off, the projected area of the sound picture will not cover the screen. By means of a special optical system, the width of the projected sound picture may be magnified to cover the screen but the height will be enlarged in the same ratio and will then be too large for the screen. A special aperture plate is provided which not only masks off the sound track, but reduces the height so that when the sound picture is projected through the special optical system it will have the same dimensions as the screen.

The sound picture, however, will be laterally displaced on the screen due to the sound record having been masked off one side. The direction of projection must thus be rotated horizontally to center the sound picture on the screen. The projector head could be rotated through a small angle with respect to the base but this would be objectionable as the take-up reel is usually secured to the base and the rotation of the projector head would introduce a twist in the film. Another method is to laterally displace one end of the projector about a pivot at the other end. The pivot may be placed at either end of the projector, but as the projection ports in many theaters are comparatively small, the rear end is preferably displaced about a pivot at the front end so that the projector beam is not displaced enough to strike the side of the port.

In a preferred embodiment of this invention, a sub-base, comprising two flat plates, superimposed and pivoted, is placed under the front of the projector base. Another sub-base comprising flat superimposing plates, is placed under the rear of the projector. By means of suitable angle levers, the upper plate may be slid longitudinally on the lower plate, displacing the rear of the projector laterally and rotating the direction of projection through a small horizontal angle.

Referring to the drawings,

Fig. 1 shows an aperture plate for silent pictures;

Fig. 2 shows an aperture plate for sound pictures;

Fig. 3 shows a plan view of the projector and screen;

Fig. 4 shows the sub-bases in position under the projector feet; and

Fig. 5 shows a view of the operating levers in detail.

An opaque plate 1 of any suitable material is pierced by an aperture 2 of such dimensions as to define the outline of the projected silent picture. The projected silent picture will then cover the screen 3 between the lines 4 and 5, equally spaced from the center line 6.

A similar opaque plate 7 of any suitable material is pierced by an aperture 8 having the side 9 shorter than the corresponding side of the aperture 2 so as to mask off the sound record. A sound picture using the aperture plate 7 and projected under the same conditions as the silent picture will only cover the portion of the screen 3 defined by the lines 4 and 10, equally spaced from a center line 11. In order to center the sound picture on the screen 3 the line of projection must be rotated horizontally till the center line 11 coincides with the center line 6. A preferred method of rotating the line of projection is disclosed in Figs. 4 and 5 described below.

When the sound picture is centered on the screen, due to the aperture 8 being smaller than the aperture 2 the projected picture will not cover the screen. The projection lens 12 is replaced by a special lens which magnifies the sound picture so that the projected sound picture covers the screen between the lines 4 and 5.

Due to the magnification produced by the special lens, the height of the projected sound picture will be increased in the same proportion as the width and will be too large for the screen. To avoid this increase in height the side 13 of the aperture 8 is made smaller than the corresponding side of the aperture 2 by the same ratio as the side 9 was made smaller than the corresponding side of the aperture 2. The reduction of the length of the side 13 will mask off a portion of the sound picture. The aperture 8 is preferably so located in the plate 7 that equal portions are masked off the top and bottom of the picture, though in some cases it may be preferable that the portions be unequal, or even that all be masked off the bottom.

A convenient method of rotating the line of projection to bring the center line 11 into coincidence with the center line 6 is to laterally displace one end of the projector about a pivot at the other end. A sub-base 14, Fig. 4 comprising two superimposed flat plates 15 and 16, pivoted at 17 are placed under laterally opposed feet of the projector, preferably under the front feet. Plate 16 may be secured to the floor by means of screws 18 inserted through the large holes 19 in plate 15 and bearing on plate 16. The feet 21 of the projector may be secured by bolts 20 to the plate 15. Due to the pivotal connection 17, plate 15 may be rotated through a small angle with respect to plate 16.

A sub-base comprising two flat plates 22 and 23, Fig. 4, superimposed on a plate 24 is placed under the other pair of feet 25 of the projector. Plate 24 may be secured by screws 26 to the floor. The feet 25 of the projector may be secured by bolts 27 to plates 22 and 23. A casting 28 extends across the width of plate 24 and is secured by screws 43 to plates 22 and 23. A shaft 29 is supported in bearings journalled in suitable bosses formed in casting 28 and supports two levers 30 and 31. Lever 30 terminates in a projection 32 which bears against the abutment 33 affixed to the plate 24 and located between the plates 22 and 23. Depressing lever 30 will cause the projection 32 to be pressed against the abutment 33 and the reaction will cause the casting 28 to slide the plates 22 and 23 longitudinally along plate 24 laterally displacing the feet 25 of the projector. The amount of the movement is regulated by the set screw 34 which limits the movement of lever 30. Lever 31 terminates in a projection 35 which engages the arm 36 of an angle lever mounted on a shaft 37 journalled in suitable bosses on the casting 28. The other arm 38 of the angle lever bears against an abutment 39 affixed to the plate 24. Depressing lever 31 will cause the projection 35 to force the lever arm 36 upward causing the lever arm 38 to be pressed against the abutment 39 and the reaction will cause casting 28 to slide the plates 22 and 23 longitudinally along plate 24 in the opposite direction to the movement resulting from the depression of lever 30 and thus returning the rear feet 25 of the projector to their original position, and restoring lever 30 to its initial position. The amount of the movement is regulated by the set screw 40 which limits the movement of lever 31.

To prevent the plates 22 and 23 from being moved along the plate 24 by the vibration of the projector, a screw (not shown) secured to the plate 24 passes through the plate 41 and is engaged by the hand wheel 42. Rotating the hand wheel 42 will clamp plate 41 to plates 22 and 23 and prevent relative movement of plates 22, 23 and 24.

What is claimed is:

1. In a motion picture projector, in combination, a sub-base comprising superimposed pivoted members and another sub-base comprising superimposed members, pedal controlled lever means to rotate the line of projection of said projector by an exact, predetermined amount and pedal controlled lever means to positively restore the line of projection of said projector to its original position.

2. In a device for rotating the line of projection of a sound picture projector, in combination, a sub-base comprising an upper and a lower plate, means adapted to secure said upper plate to the front feet of said projector, means adapted to secure said lower plate to the floor, and means pivotally joining said upper and said lower plate, and a second sub-base comprising upper plates and a lower plate, means adapted to secure said upper plates to the rear feet of said projector, means adapted to secure said lower plate to the floor, means slidably retaining said upper plates superimposed on said lower plate and pedal controlled lever means for sliding said upper plates an exact predetermined amount longitudinally over said lower plate and pedal controlled lever means to positively restore said upper plates to their original position.

3. In a device for rotating the line of projection of a sound picture projector having two pairs of feet, in combination, a sub-base comprising an upper and a lower plate, means adapted to secure said upper plate to laterally opposed feet of said projector, means adapted to secure said lower plate to the floor, and means pivotally securing said upper plate superimposed on said lower plate and a second sub-base comprising upper plates and a lower plate, means adapted to secure said upper plates to other laterally opposed feet of said projector, means adapted to secure said lower plate to the floor, means slidably retaining said upper plates superimposed on said lower plate, means for sliding said upper plates longitudinally of said lower plate comprising an abutment on said lower plate, lever means pivotally affixed to said upper plates, a projection on said lever means bearing against said abutment and adapted to cause said upper plates to slide on said lower plate, and an adjustable stop to limit the movement of said lever means, and means for restoring said upper plates to their original position comprising a second abutment on said lower plate, an angle lever pivotally affixed to said upper plates, an arm of said angle lever bearing against said second abutment and adapted to cause said upper plates to slide longitudinally of said lower plate in a direction opposite to said first movement, a second lever means pivotally affixed to said upper plates, a projection on said lever means adapted to engage and operate the second arm of said angle lever, and an adjustable stop to limit the movement of said second lever means.

4. In a device for rotating the line of projection of a sound picture projector having two pairs of feet, in combination, a sub-base comprising an upper and a lower plate, means for securing said upper plate to laterally opposed feet of said projector, means for securing said lower plate to the floor, and means pivotally securing said upper plate superimposed on said lower plate, and a second sub-base comprising upper plates and a lower plate, means securing said upper plates to other laterally opposed feet of said projector, means for securing said lower plate to the floor, means for sliding said upper plates longitudinally of said lower plate comprising an abutment on said lower plate, a casting seiored to said upper plates, lever means pivotally affixed to said casting, a projection on said lever means bearing against said abutment, and adapted to cause said upper plates to slide on said lower plate and an adjustable stop to limit the movement of said lever means, means for restoring said upper plates to their original position comprising a second abutment on said lower plate, an angle lever pivotally affixed to said casting, an arm of said angle lever bearing against said second abutment and adapted to cause said upper plates to slide longitudinally of said lower plate in a direction opposite to said first movement, a second lever means pivotally affixed to said casting, a projection on said lever means adapted to engage and operate the second arm of said angle lever and an adjustable stop to limit the movement of said second lever means and clamping means slidably retaining said upper plates on said lower plate and capable of clamping said upper plates to said lower plate.

In witness whereof, we hereunto subscribe our names this 30th day of October, 1930.

ANTONIO GASTONGUAY.
GEORGE PULLER.